(12) United States Patent
Hsieh

(10) Patent No.: US 6,269,139 B1
(45) Date of Patent: Jul. 31, 2001

(54) METHODS AND APPARATUS FOR PRE-FILTERING WEIGHTING IN IMAGE RECONSTRUCTION

(75) Inventor: Jiang Hsieh, Brookfield, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/390,449

(22) Filed: Sep. 7, 1999

(51) Int. Cl.[7] ..................................................... A61B 6/03
(52) U.S. Cl. .................. 378/4; 378/19; 378/901
(58) Field of Search ..................... 378/4, 15, 19, 378/901

(56) References Cited

U.S. PATENT DOCUMENTS 4,703,424 * 10/1987 Gullberg et al. ..................... 378/14

* cited by examiner

*Primary Examiner*—David V. Bruce
(74) *Attorney, Agent, or Firm*—Armstrong Teasdale LLP; Christian G. Cabou

(57) ABSTRACT

Methods and apparatus for weighting data collected in a computed tomography scan using a digital flat panel are described. In one embodiment, the method includes the steps of selecting a weighting function in which (a) a sum of weights of complementary samples equals unity, the weighting function is continuous and differentiable along γ where γ is the fan angle, the weighting function approaches zero near an edge of the panel and approaches unity near a panel boundary, and the weighting function remains constant for a range $\xi_1 < \xi < \xi_2$, where $\xi_1$ and $\xi_2$ are determined based on an end intersecting point of a complimentary ray within a reconstruction field of view.

18 Claims, 3 Drawing Sheets

METHODS AND APPARATUS FOR PRE-FILTERING WEIGHTING IN IMAGE RECONSTRUCTION

BACKGROUND OF THE INVENTION

This invention relates generally to image reconstruction using data collected in a computed tomography scan and, more particularly, to generating an volumetric computed tomography imaging using half-projection data.

In at least one known computed tomography (CT) imaging system configuration, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. A group of x-ray attenuation measurements, i.e., projection data, from the detector array at one gantry angle is referred to as a "view". A "scan" of the object comprises a set of views made at different gantry angles, or view angles, during one revolution of the x-ray source and detector. In an axial scan, the projection data is processed to construct an image that corresponds to a two dimensional slice taken through the object. One method for reconstructing an image from a set of projection data is referred to in the art as the filtered back projection technique. This process converts the attenuation measurements from a scan into integers called "CT numbers" or "Hounsfield units", which are used to control the brightness of a corresponding pixel on a cathode ray tube display.

In volumetric CT, data is collected using a large flat panel digital x-ray device, or detector, having a plurality of pixels arranged in rows and columns. More specifically, the imaging system includes an x-ray source and at least one solid-state x-ray detector. To generate volumetric images, at least one of the x-ray source and the x-ray detector are rotated around the object of interest. For each identified view, x-rays are emitted from the x-ray source toward the x-ray detector and projection data is collected for the view.

Because of magnification in cone beam geometry, a system having even the largest available flat panel detector has a useful scan field of view too small to cover a typical patient. To overcome limited panel size, the panel can be offset from iso-center to increase scan field of view by utilizing $2\pi$ rotation of projections. In such a configuration, each projection is truncated and image artifacts typically result.

BRIEF SUMMARY OF THE INVENTION

Methods and apparatus for weighting data collected in a computed tomograph scan using a digital flat panel are described. In one embodiment, the method includes the steps of selecting a weighting function which satisfies the following criteria.

(a) A sum of weights of conjugate samples equals unity.

(b) The weighting function is continuous and differentiable along $\gamma$ where $\gamma$ is the fan angle.

(c) The weighting function approaches zero near an edge of the panel and approaches unity near a panel boundary.

(d) The weighting function remains constant for a range $\xi_1 < \xi < \xi_2$, where $\xi_1$ and $\xi_2$ are determined based on an end intersecting point of a complimentary ray within a reconstruction field of view.

An exemplary weighting function is:

$$w(\gamma) = \begin{cases} 0 & \gamma \leq -\gamma_b \\ 3\theta(\gamma)^2 - 2\theta(\gamma)^3 & -\gamma_b < \gamma \leq \gamma_b \\ 1 & \text{otherwise} \end{cases}$$

where:

$$\theta(\gamma) = \frac{\gamma + \gamma_b}{2\gamma_b}.$$

DETAILED DESCRIPTION OF THE INVENTION

Figure 1:
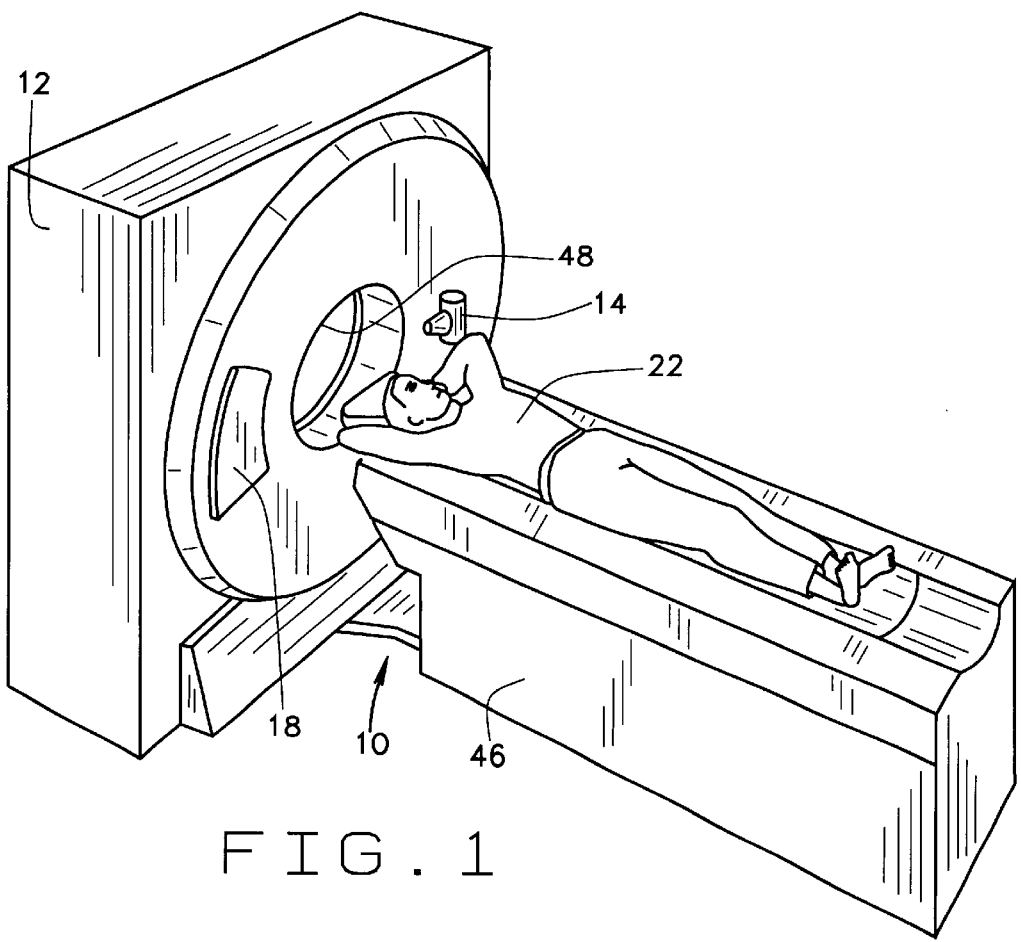
FIG. 1 is a pictorial view of a CT imaging system.
Figure 2:
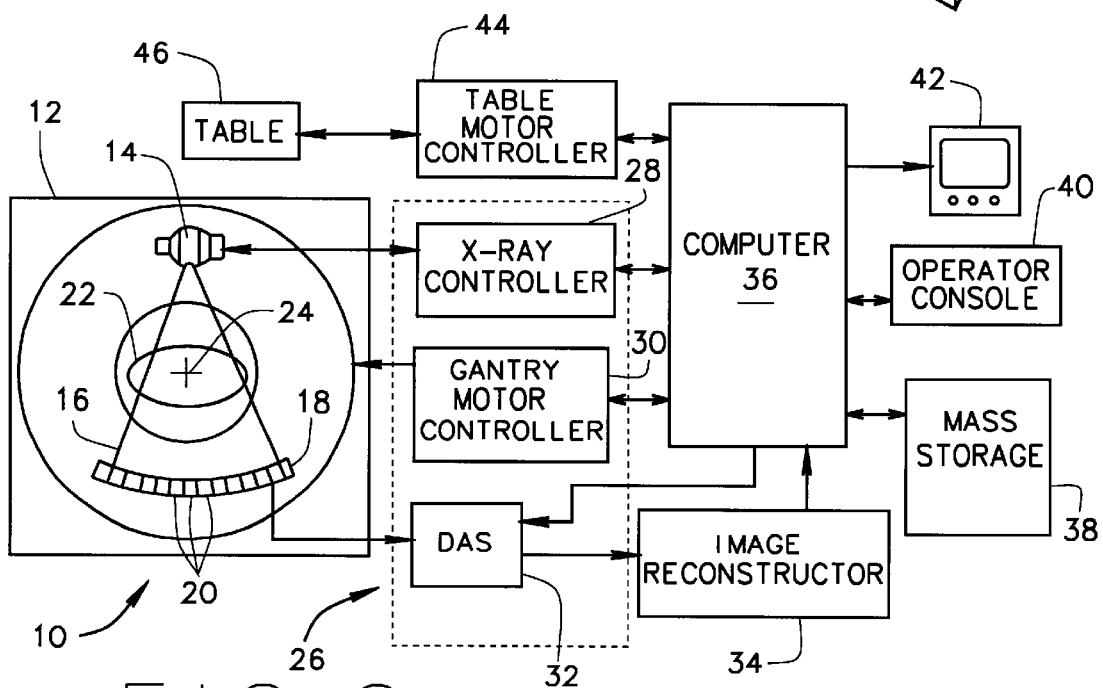
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20 which together sense the projected x-rays that pass through an object 22, for example a medical patient. Detector array 18 may be fabricated in a single slice or multi-slice configuration. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

Figure 3:
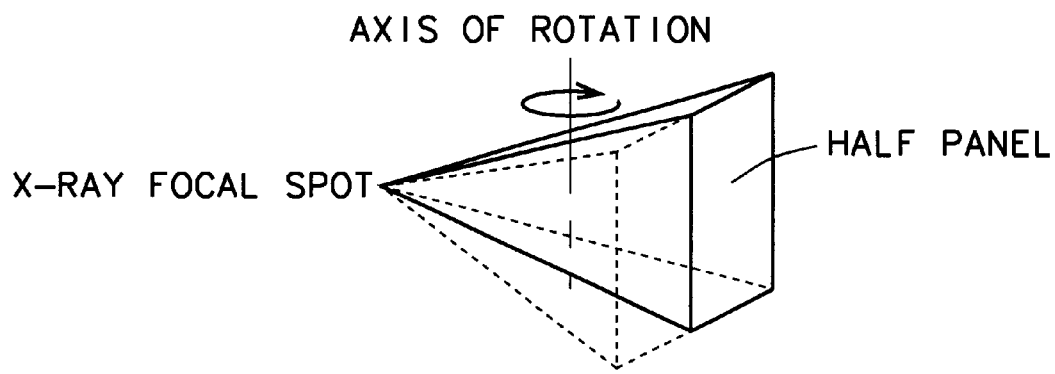
FIG. 3 is a schematic illustration of the geometry associated with collecting data using a half panel configuration.

FIG. 3 illustrates the geometry of a half panel CT system. A single panel covers slightly over half the field of view, and the x-ray source and the panel rotate 360 degrees. By reducing the data collection requirement to about one-half the data collected by a panel, the useful scan field of view is increased.

To eliminate artifacts resulting from truncated projections, the following weighting algorithm can be utilized. The weighting algorithm may be performed, for example, by a processor in image reconstructor 34 or by computer 36.

Specifically, and for a simple fan beam scanning geometry (the center slice in VCT), a weighing function using the redundant samples of the projection data in $2\pi$ range can be utilized to weight the collected data. In a fan beam geometry, the samples $(\gamma,\beta)$ and $(-\gamma,\beta+\pi-2\gamma)$ form a conjugate sampling pair where $\gamma$ is a fan angle and $\beta$ a projection view angle.

Figure 4:
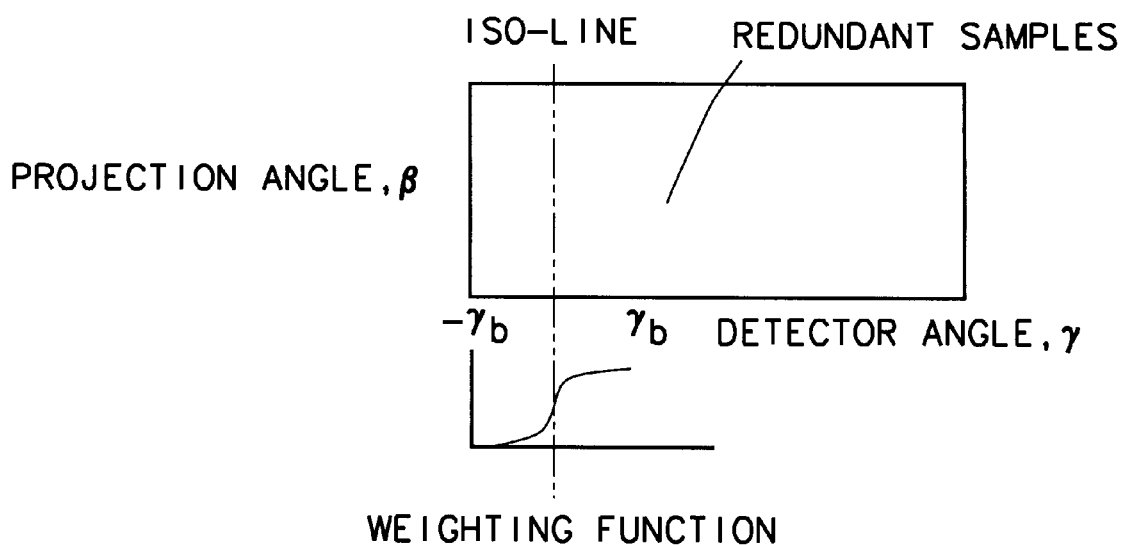
FIG. 4 illustrates an exemplary weighting function in relation to data sample.

For a flat panel, and when the panel is positioned slightly beyond the isochannel, the overlapped (or redundant sampling) regions can be depicted as illustrated in FIG. 4. FIG. 4 illustrates a Radon space sampling pattern. The weighting function satisfies the following three conditions:

(a) the sum of the weights of the complementary samples equal unity, (b) the weighting function is continuous and differentiable along $\gamma$, and (c) the weight approaches zero near the edge of the panel and approaches unity near the other boundary.

The term "complementary" is used instead of conjugate because the two rays are not redundant samples. The rays merely share the property that their $\beta$ angles are 180 degrees apart.

An example of the weighting function is:

$$w(\gamma) = \begin{cases} 0 & \gamma \leq -\gamma_b \\ 3\theta(\gamma)^2 - 2\theta(\gamma)^3 & -\gamma_b < \gamma \leq \gamma_b \\ 1 & \text{otherwise} \end{cases} \quad (1)$$

where $$\theta(\gamma) = \frac{\gamma + \gamma_b}{2\gamma_b}$$

Figure 5:
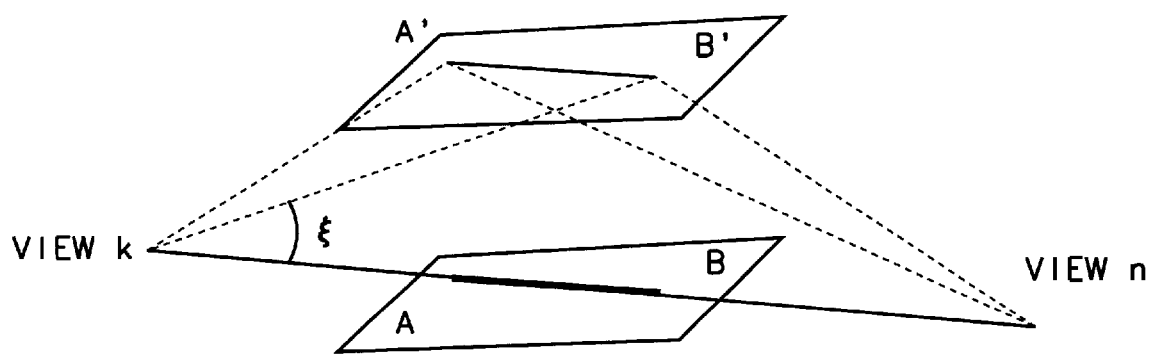
FIG. 5 illustrates tilt angle dependency.

For the projection samples that do not form a fan beam sampling (i.e., the off-centered slices), the conjugate samples do not exist and for different image reconstruction locations, the cone beam tilting angle changes. Referring to FIG. 5, each projection sample is denoted as $(\gamma,\beta,\xi)$ where $\gamma$, $\beta$, and $\xi$ are the fan angle, projection view angle, and tilt angle, respectively. For the center plane, if two points (labeled by A and B) coincide with a projection ray, the points will also be coincide with the conjugate sampling ray. If the same two points moved vertically off the center plane (labeled by A' and B'), the ray pairs that form the complementary samples for A" will be different from those for B'.

To ensure the property that the total contribution to each reconstructed point remains constant, the additional constraint that the weighting function remain constant for the range $\xi_1 < \xi < \xi_2$, where $\xi_1$ and $\xi_2$ are determined based on the end intersecting point of the complimentary ray with the reconstruction field of view, is utilized. A simple example of the weighting function that satisfies this condition is described in Equation 1. The weights remain constant for the entire range of $\xi$.

With the weighting function described above, the size of the panel is slightly larger than the radius of the field of view (to cover the range $-\gamma_o < \gamma < 0$). Although fewer than all the channels are needed for weighting in accordance with the foregoing weighting algorithm (typically around 20 channels are required), the weighting algorithm can further be configured so that no additional overlapped channels are required.

Figure 6:
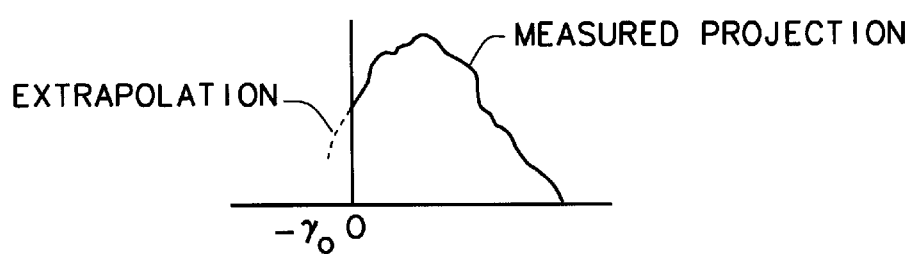
FIG. 6 illustrates an extrapolation of projection data.

Specifically, the projection data at the edge of the panel is further extrapolated for the range $-\gamma_o < \gamma < 0$. Such extrapolation can be performed using many known extrapolation techniques. For example, the extrapolated data could be formed based on the slope of the projection data near the edge or a polynomial fit of the projection data at the edge of the projection can be performed. The results of the extrapolation is illustrated in FIG. 6.

With the extrapolated projection data, the above weighting scheme is then applied to suppress the discontinuity of the projection at the edge. Since the extrapolated data is, in general, less reliable than the real measurement, the weighting function can be configured to provide higher weights to the measured data than to the extrapolated data.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. In addition, the CT system described herein is a "third generation" system in which both the x-ray source and detector rotate with the gantry. Many other CT systems including "fourth generation" systems wherein the detector is a full-ring stationary detector and only the x-ray source rotates with the gantry, may be used if individual detector elements are corrected to provide substantially uniform responses to a given x-ray beam. Moreover, the system described herein performs an axial scan, however, the invention may be used with a helical scan although more than 360° of data are required. Accordingly, the spirit and scope of the invention are to be limited only by the terms of the appended claims.

What is claimed is:

1. A method for weighting data collected from a portion of a digital flat panel in a computed tomograph system, said method comprising the steps of:

selecting a weighting function in which a sum of weights of complementary samples equals unity, the weighting function is continuous and differentiable along $\gamma$ where $\gamma$ is the fan angle, the weighting function approaches zero near an edge of the panel and approaches unity near a panel boundary, and the weighting function remains constant for a range $\xi_1 < \xi < \xi_2$, where $\xi_1$ and $\xi_2$ are determined based on an end intersecting point of a complimentary ray within a reconstruction field of view; and applying the weighting function to the data.

2. A method in accordance with claim 1 wherein the weighting function is:

$$w(\gamma) = \begin{cases} 0 & \gamma \leq -\gamma_b \\ 3\theta(\gamma)^2 - 2\theta(\gamma)^3 & -\gamma_b < \gamma \leq \gamma_b \\ 1 & \text{otherwise} \end{cases}$$

where:

$$\theta(\gamma) = \frac{\gamma + \gamma_b}{2\gamma_b}.$$

3. A method in accordance with claim 1 further comprising the step of extrapolating projection data at the edge of the panel for a range $-\gamma°<\gamma<0$.

4. A method in accordance with claim 3 wherein the extrapolation is based on a slope of the projection data near the panel edge.

5. A method in accordance with claim 3 wherein the extrapolation is based on a polynomial fit of the projection data at the edge of the panel.

6. A method in accordance with claim 3 wherein the weighting function provides higher weights to the measured data than to the extrapolated data.

7. Apparatus for reconstructing an image using projection data collected in a computed tomograph scan, said apparatus comprising a processor programmed to:
  obtain the projection data; and
  apply a weighting function to the projection data, the weighting function providing that a sum of weights of complementary samples equals unity, being continuous and differentiable along $\gamma$ where $\gamma$ is the fan angle, approaching zero near an edge of the panel and approaching unity near a panel boundary, and remaining constant for a range $\xi_1<\xi<\xi_2$, where $\xi_1$ and $\xi_2$ are determined based on an end intersecting point of a complimentary ray within a reconstruction field of view.

8. Apparatus in accordance with claim 7 wherein the weighting function is:

$$w(\gamma) = \begin{cases} 0 & \gamma \leq -\gamma_b \\ 3\theta(\gamma)^2 - 2\theta(\gamma)^3 & -\gamma_b < \gamma \leq \gamma_b \\ 1 & \text{otherwise} \end{cases}$$

where $$\theta(\gamma) = \frac{\gamma + \gamma_b}{2\gamma_b}.$$

9. Apparatus in accordance with claim 7 wherein the processor is further programmed to extrapolate projection data at the edge of the panel for a range $-\gamma°<\gamma<0$.

10. Apparatus in accordance with claim 9 wherein the processor is programmed to perform the extrapolation based on a slope of the projection data near the panel edge.

11. Apparatus in accordance with claim 9 wherein the processor is as programmed to perform the extrapolation based on a polynomial fit of the projection data at the edge of the panel.

12. Apparatus in accordance with claim 9 wherein the processor is programmed to provide higher weights to the measured data than to the extrapolated data.

13. A computed tomograph system comprising a flat panel digital detect for collecting data, and a processor programmed to weight the collected data by applying a weighting function to the projection data, said weighting function providing that a sum of weights of complementary samples equals unity, said weighting function being continuous and differentiable along $\gamma$ where $\gamma$ is the fan angle, said weighting function approaching zero near an edge of said panel and approaching unity near a panel boundary, said weighting function remaining constant for a range $\xi_1<\xi<\xi_2$, where $\xi_1$ and $\xi_2$ are determined based on an end intersecting point of a complimentary ray within a reconstruction field of view.

14. A computed tomograph system in accordance with claim 13 wherein the weighting function is:

$$w(\gamma) = \begin{cases} 0 & \gamma \leq -\gamma_b \\ 3\theta(\gamma)^2 - 2\theta(\gamma)^3 & -\gamma_b < \gamma \leq \gamma_b \\ 1 & \text{otherwise} \end{cases}$$

where $$\theta(\gamma) = \frac{\gamma + \gamma_b}{2\gamma_b}.$$

15. A computed tomograph system in accordance with claim 13 wherein said processor is further programmed to extrapolate projection data at an edge of said panel for a range $-\gamma°<\gamma<0$.

16. A computed tomograph system in accordance with claim 15 wherein said processor is programmed to perform the extrapolation based on a slope of the projection data near said panel edge.

17. A computed tomograph system in accordance with claim 15 wherein said processor is programmed to perform the extrapolation based on a polynomial fit of the projection data at said panel edge.

18. A computed tomograph system in accordance with claim 15 wherein said processor is programmed to provide higher weights to the measured data than to the extrapolated data.

* * * * *

UNITED STATES PATENT AND TRADEMARK OFFICE
CERTIFICATE OF CORRECTION

PATENT NO. : 6,269,139 B1
DATED : July 31, 2001
INVENTOR(S) : Hsieh

It is certified that error appears in the above-identified patent and that said Letters Patent is hereby corrected as shown below:

Column 3,
Line 26, delete "2 $\gamma$" and substitute -- $2\gamma$ --.

Column 4,
Line 2, delete "A" " and substitute -- A' --.
Lines 14 and 21, delete "-$\gamma_o$" and substitute -- -$\gamma_o$ --.

Column 5,
Lines 14 and 53, delete "-$\gamma^o$" and substitute -- -$\gamma_o$ --.

Column 6,
Line 2, delete "as".
Line 40, delete "-$\gamma^o$" and substitute -- -$\gamma_o$ --.

Signed and Sealed this

Twenty-third Day of July, 2002

Attest:

JAMES E. ROGAN
Attesting Officer
Director of the United States Patent and Trademark Office